United States Patent
Yum et al.

(10) Patent No.: US 10,582,405 B2
(45) Date of Patent: Mar. 3, 2020

(54) METHOD FOR REPORTING CHANNEL STATE AND APPARATUS THEREFOR IN WIRELESS COMMUNICATION SYSTEM

(71) Applicant: LG ELECTRONICS INC., Seoul (KR)

(72) Inventors: Kunil Yum, Seoul (KR); Jonghyun Park, Seoul (KR); Haewook Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/089,904

(22) PCT Filed: Mar. 23, 2017

(86) PCT No.: PCT/KR2017/003133
§ 371 (c)(1),
(2) Date: Sep. 28, 2018

(87) PCT Pub. No.: WO2017/171305
PCT Pub. Date: Oct. 5, 2017

(65) Prior Publication Data
US 2019/0124534 A1   Apr. 25, 2019

Related U.S. Application Data

(60) Provisional application No. 62/314,982, filed on Mar. 29, 2016.

(51) Int. Cl.
*H04L 12/26* (2006.01)
*H04W 24/10* (2009.01)
(Continued)

(52) U.S. Cl.
CPC .......... *H04W 24/10* (2013.01); *H04B 7/0456* (2013.01); *H04B 7/06* (2013.01); *H04B 7/063* (2013.01)

(58) Field of Classification Search
CPC ........ H04B 7/0456; H04B 7/06; H04B 7/063; H04L 25/00; H04W 24/10
See application file for complete search history.

(56) References Cited

U.S. PATENT DOCUMENTS

2016/0119097 A1* 4/2016 Nam ..................... H04L 5/0023
370/329

FOREIGN PATENT DOCUMENTS

KR   1020120089820   8/2012
WO   2010147416      12/2010

OTHER PUBLICATIONS

PCT International Application No. PCT/KR2017/003133, Written Opinion of the International Searching Authority dated Jul. 20, 2017, 16 pages.

(Continued)

*Primary Examiner* — Minh Trang T Nguyen
(74) *Attorney, Agent, or Firm* — Lee, Hong, Degerman, Kang & Waimey

(57) ABSTRACT

The present invention according to one embodiment comprises the steps of: receiving linear-combination (LC) code word-based channel state reporting configuration, which is expressed by parameters comprising an LC coefficient and a phase differential (co-phase) value between antenna groups having mutually different polarization characteristics; measuring a downlink reference signal for a channel state reporting in accordance with the received channel state reporting configuration; and transmitting, to a base station, the LC code book-based channel state report corresponding to the reference signal measurement, wherein the channel state reporting can only support a broadband reporting mode.

14 Claims, 9 Drawing Sheets

(51) Int. Cl.
    *H04B 7/0456*     (2017.01)
    *H04B 7/06*     (2006.01)

(56) References Cited

OTHER PUBLICATIONS

Nam, Y. et al., "Full Dimension MIMO for LTE-Advanced and 5G", In: Information Theory and Applications Workshop (ITA) 2015, Feb. 2015, pp. 143-148, 8 pages.
Motorola, "Enhanced 4 Tx Codebook", 3GPP TSG RAN WG1 Meeting #72bis, R1-131725, Apr. 2013, 9 pages.
Samsung, "New WID Proposal: Enhancements on Full-Dimension (FD) MIMO for LTE", 3GPP TSG RAN Meeting #71, RP-160623, Mar. 2016, 10 pages.

* cited by examiner

FIG. 6
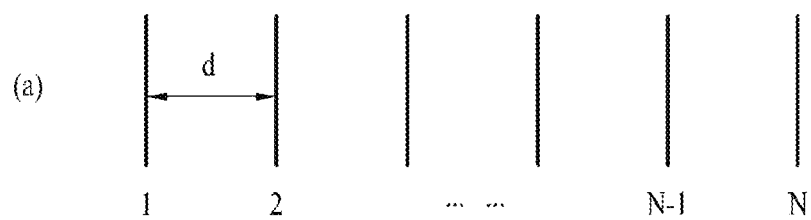
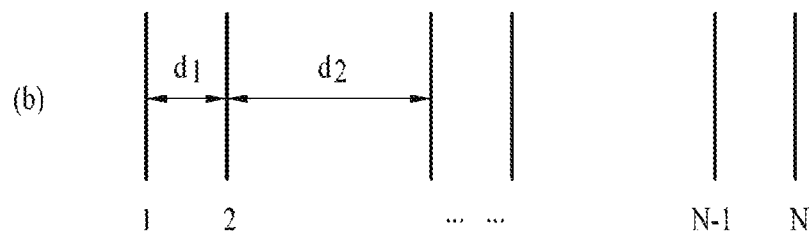
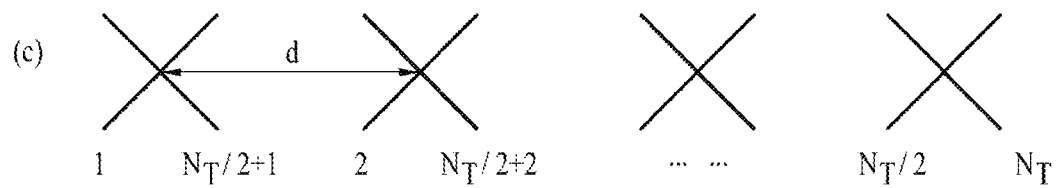

METHOD FOR REPORTING CHANNEL STATE AND APPARATUS THEREFOR IN WIRELESS COMMUNICATION SYSTEM

CROSS-REFERENCE TO RELATED APPLICATIONS

This application is the National Stage filing under 35 U.S.C. 371 of International Application No. PCT/KR2017/003133, filed on Mar. 23, 2017, which claims the benefit of U.S. Provisional Application No. 62/314,982, filed on Mar. 29, 2016, the contents of which are all hereby incorporated by reference herein in their entireties.

TECHNICAL FIELD

The present invention relates to a wireless communication system, and more particularly, to a method of reporting a channel state in a wireless communication system and an apparatus therefor.

BACKGROUND ART

In accordance with the introduction of FD (full dimension) MIMO (multiple input multiple output) environment, 2D domain to be used by a terminal can be determined or used by transmitting K (>1) number of CSI-RS (reference signal) resources to which different 2D (vertical and/or horizontal) precoding is applied within a single CSI (channel state information) process. In this case, when the terminal reports CSI-RS-based CSI to a base station, it is necessary to have a method capable of reporting more accurate CSI.

DISCLOSURE OF THE INVENTION

Technical Task

The present invention intends to propose a method of reporting a channel state in a wireless communication system and an operation related to the method.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of reporting a channel state, which is reported by a terminal in a wireless communication system, includes receiving linear-combination (LC) code word-based channel state report configuration, which is expressed by parameters including an LC coefficient and a phase difference (co-phase) value between antenna groups having different polarization characteristics, measuring a downlink reference signal to report a channel state according to the received channel state reporting configuration, and transmitting the LC codeword-based channel state report to a base station according to the measurement of the reference signal. In this case, the channel state report may support a wideband reporting mode only.

Additionally or alternatively, the channel state report may include or indicate the LC coefficient and the co-phase value.

Additionally or alternatively, the channel state report may include a size parameter or a phase parameter of the LC coefficient.

Additionally or alternatively, the method may further include receiving an indication or a configuration for whether or not the channel state report is configured by a wideband report from the base station.

Additionally or alternatively, the channel state report configuration may include an aperiodic channel state information request.

Additionally or alternatively, when the channel state report is triggered by the aperiodic channel state information request, the LC coefficient, which is transmitted as the channel state report, may be mapped to a physical uplink data channel region to which a channel quality indicator is mapped in a manner of being concatenated to the bit of the channel quality indicator in a bit level.

Additionally or alternatively, when the channel state report is triggered by the aperiodic channel state information request and the LC coefficient, which is transmitted as the channel state report, is configured by wideband report, the LC coefficient may be mapped to a physical uplink data channel region to which a rank indicator is mapped in a manner of being concatenated to the bit of the rank indicator in a bit level.

To further achieve these and other advantages and in accordance with the purpose of the present invention, according to a different embodiment, a terminal configured to report a channel state in a wireless communication system includes a transmitter, a receiver, and a processor configured to control the transmitter and the receiver, the processor receives linear-combination (LC) codeword-based channel state report configuration, which is expressed by parameters containing an LC coefficient and a phase difference (co-phase) value between antenna groups having different polarization characteristics, measure a downlink reference signal to report a channel state according to the received channel state reporting configuration, and transmits the LC codeword-based channel state report to a base station according to the measurement of the reference signal. In this case, the channel state report may support a wideband reporting mode only.

Additionally or alternatively, the channel state report may include or indicate the LC coefficient and the co-phase value.

Additionally or alternatively, the channel state report may include a size parameter or a phase parameter of the LC coefficient.

Additionally or alternatively, the processor may receive an indication or a configuration for whether or not the channel state report is configured by a wideband report from the base station.

Additionally or alternatively, the channel state report configuration may include an aperiodic channel state information request.

Additionally or alternatively, when the channel state report is triggered by the aperiodic channel state information request, the LC coefficient, which is transmitted as the channel state report, may be mapped to a physical uplink data channel region to which a channel quality indicator is mapped in a manner of being concatenated to the bit of the channel quality indicator in a bit level.

Additionally or alternatively, when the channel state report is triggered by the aperiodic channel state information request and the LC coefficient, which is transmitted as the channel state report, is configured by wideband report, the LC coefficient may be mapped to a physical uplink data channel region to which a rank indicator is mapped in a manner of being concatenated to the bit of the rank indicator in a bit level.

Technical solutions obtainable from the present invention are non-limited the above-mentioned technical solutions. And, other unmentioned technical solutions can be clearly understood from the following description by those having ordinary skill in the technical field to which the present invention pertains.

Advantageous Effects

According to one embodiment of the present invention, it is able to efficiently report a channel state in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 6 illustrates a configuration of 8-Tx transmission antennas;

BEST MODE

Mode for Invention

Figure 1:
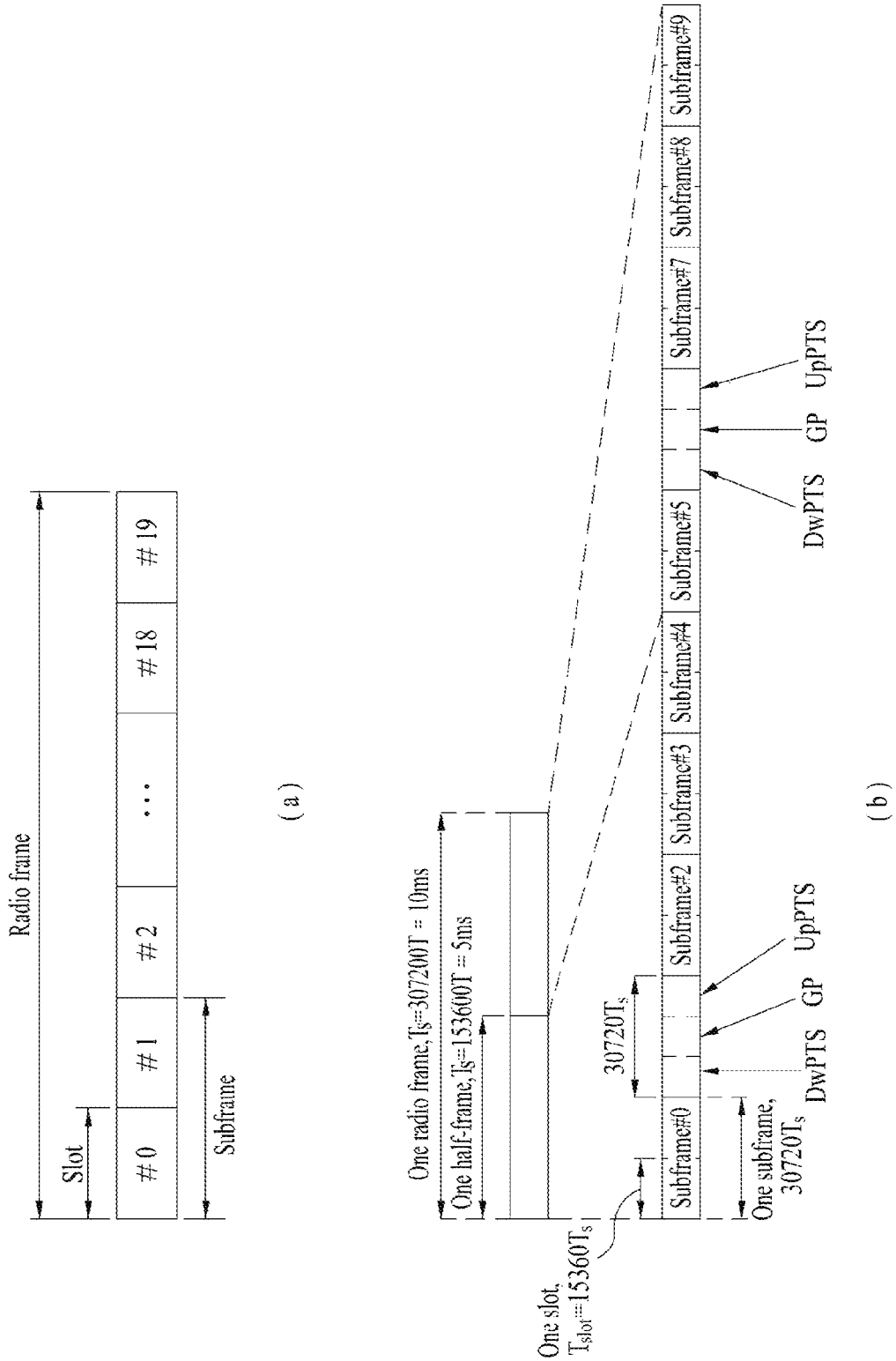
FIG. 1 is a diagram for an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e., single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to multiple nodes may control the nodes such that signals are simultaneously transmitted to or received from a UE through some or all nodes. While there is a difference between multi-node systems according to the nature of each node and implementation form of each node, multi-node systems are discriminated from single node systems (e.g., a centralized antenna system (CAS), conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes may be applied to various types of multi-node systems. For example, a node refers to an antenna group spaced apart from another node by a predetermined distance or more, in general. However, embodiments of the present invention, which will be described below, may even be applied to a case in which a node refers to an arbitrary antenna group irrespective of node interval. In the case of an eNB including an X-pole (cross-polarized) antenna, for example, the embodiments of the preset invention are applicable on the assumption that the eNB controls a node composed of an H-pole antenna and a node composed of a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200Ts) and includes 10 subframes in equal size. The 10 subframes in the radio frame may be numbered. Here, Ts denotes sampling time and is represented as Ts=1/(2048*15 kHz). Each subframe has a length of 1ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |

TABLE 1-continued

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
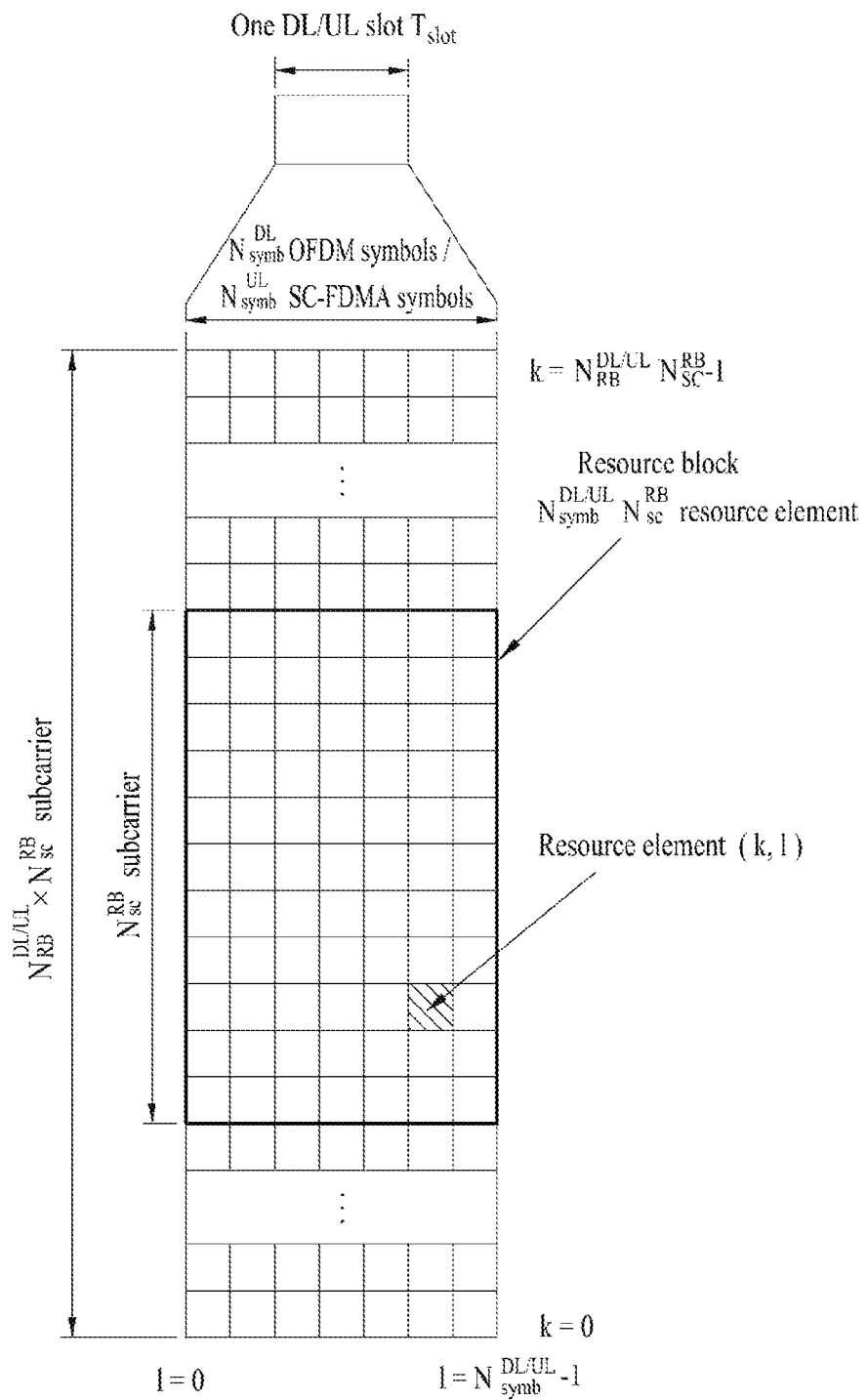
FIG. 2 is a diagram for an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL}*N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL}*N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL}*N_{sc}^{RB}$ REs. Each RE in a resource grid can be uniquely defined by an index pair (k, l) in a slot. Here, k is an index in the range of 0 to $N_{symb}^{DL/UL}*N_{sc}^{RB}$ −1 in the frequency domain and l is an index in the range of $N_{symb}^{DL/UL}$ −1.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}$ −1, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
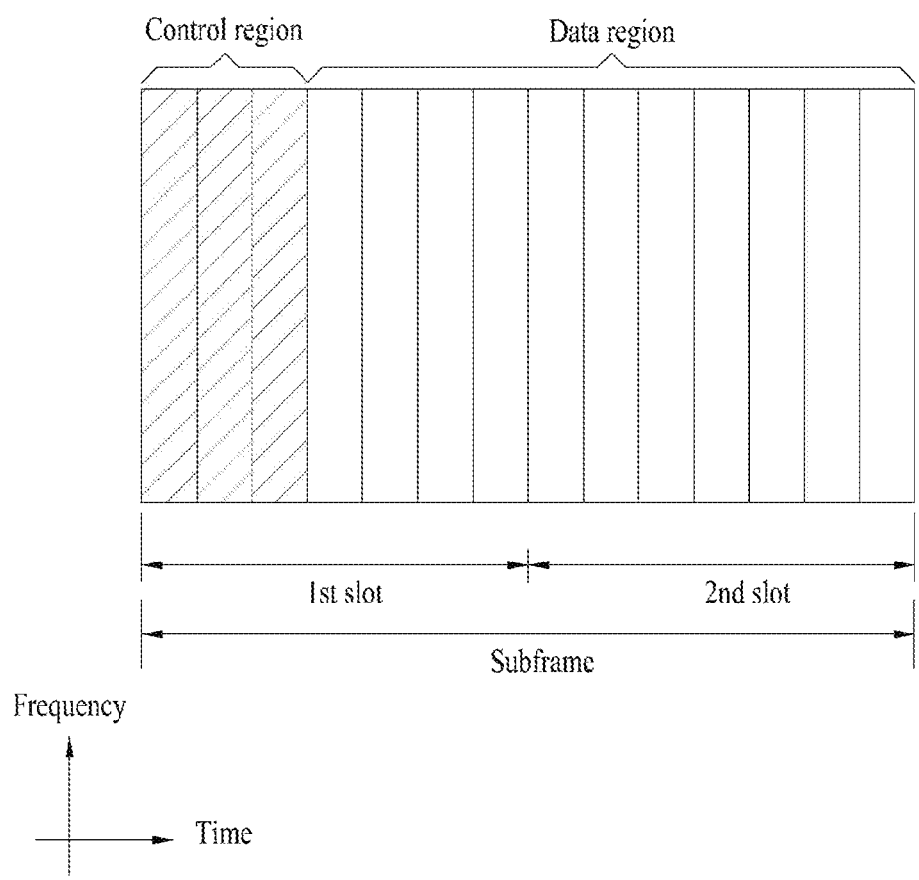
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Type | Search Space | | Number of PDCCH candidates $M^{(L)}$ |
|---|---|---|---|
| | Aggregation Level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
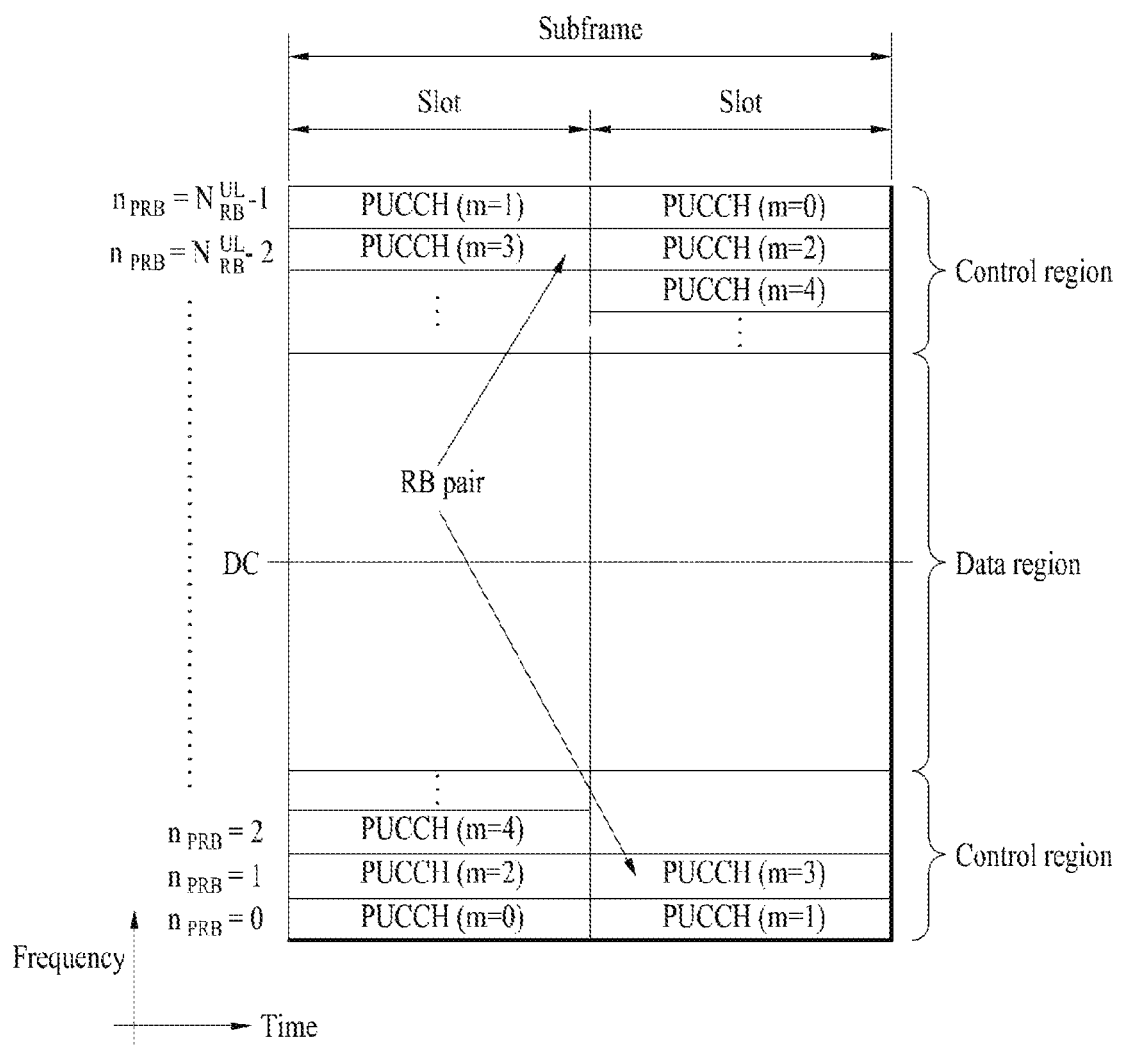
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A(exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Codebook-based Precoding

In order to support multi-antenna transmission, precoding for properly distributing information to be transmitted to the respective antennas according to the channel conditions may be employed. The codebook-based precoding technique refers to a technique of predetermining a precoding matrix set in a transmit terminal and a receive terminal, causing the receive terminal to measure channel information from the transmit terminal and feed back, to the transmit terminal, an indication (i.e., a precoding matrix index (PMI)) indicating the most appropriate precoding matrix and causing the transmit terminal to apply appropriate precoding to signal transmission based on the PMI. According to this technique, since an appropriate precoding matrix is selected in the predetermined precoding matrix set, feedback overhead may be reduced compared to the case of explicitly feeding back optimum precoding information through channel information even if optimum precoding is not always applied.

Figure 5:
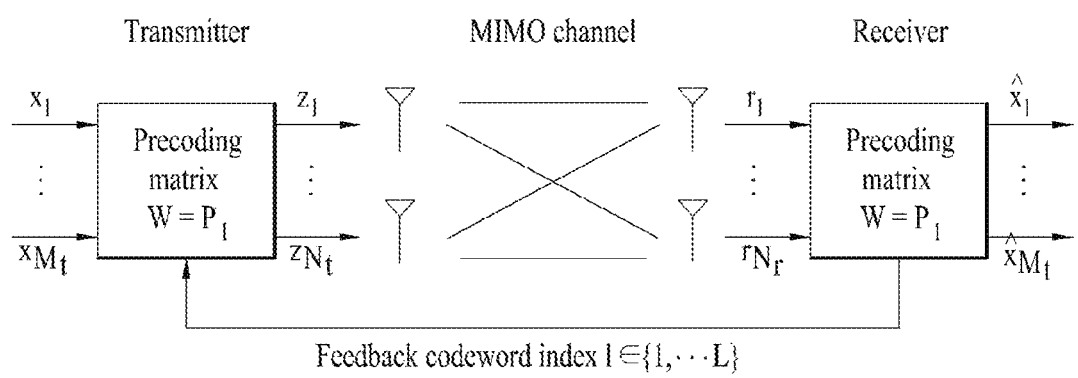
FIG. 5 illustrates codebook-based beamforming.
Figure 7:
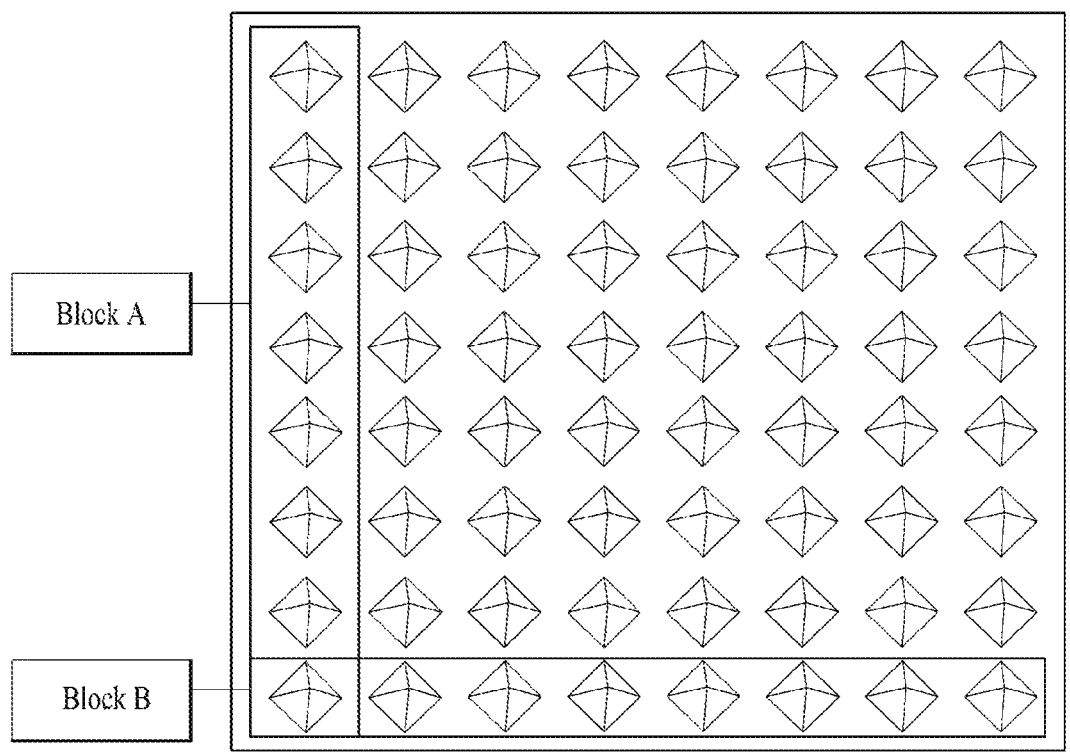
FIG. 7 illustrates 2D (dimension) or FD (full dimension) antenna structure.

FIG. 5 illustrates the basic concept of codebook-based precoding.

According to the codebook-based precoding, the transmit terminal and receive terminal share codebook information including precoding matrices, the number of which is predetermined according to the transmission rank, the number of antennas, and the like. That is, the precoding-based codebook may be used if the feedback information is finite. The receive terminal may measure the channel state through a received signal, and feed back, to the transmit terminal, information about a finite number of preferred precoding matrices (namely, indexes of the corresponding precoding matrices). For example, the received terminal may measure the receive signal using the technique of maximum likelihood (ML) or minimum mean square error (MMSE), and select an optimum precoding matrix. While FIG. 5 illustrates that the receive terminal transmits, to the transmit terminal, precoding matrix information for respective codewords, embodiments of the present invention are not limited thereto.

Upon receiving feedback information from the receive terminal, the transmit terminal may select a specific precoding matrix in a codebook, based on the received information. Upon selecting the precoding matrix, the transmit terminal may perform precoding by multiplying layer signals, the number of which corresponds to a transmission rank by the selected precoding matrix, and transmit a transmit signal obtained through precoding via a plurality of antennas. The number of rows of the precoding matrix equals the number of antennas, and the number of columns of the precoding matrix equals the rank value. Since the rank value equals the number of layers, the number of columns of the precoding matrix equals the number of layers. For example, if the number of transmit antennas is 4, and the number of transmit layers is 2, the precoding matrix may be configured as a 4×2 matrix. Information transmitted through the respective layers using the precoding matrix may be mapped to the respective antennas.

Upon receiving the signal precoded and transmitted by the transmit terminal, the receive terminal may restore the received signal by performing reverse processing of the precoding performed by the transmit terminal. Typically, since a precoding matrix satisfies the criterion for a unitary matrix (U) such as $U*U^H=I$, the aforementioned reverse processing of the precoding may be implemented by multiplying the received signal by a Hermitian matrix $P^H$ for the precoding matrix P.

For example, Table 5 below shows a codebook used for downlink transmission using 2 transmit (Tx) antennas in 3GPP LTE Release-8/9, and Table 6 below shows a codebook used for downlink transmission using 4 Tx antennas in 3GPP LTE Release-8/9.

TABLE 5

| Codebook index | Number of rank | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 6

| Codebook index | $u_n$ | Number of layers v | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |

TABLE 6-continued

| Codebook index | $u_n$ | Number of layers v | | | |
|---|---|---|---|---|---|
| | | 1 | 2 | 3 | 4 |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 6, $W_n^{\{s\}}$ is obtained with a set $\{s\}$ configured by an equation expressed as $W_n = I - 2u_n u_n^H / u_n^H u_n$. Herein, I denotes a 4×4 single matrix, and $u_n$ has a value given in Table 6.

As shown in Table 5, a codebook for 2 Tx antennas has 7 precoding vectors/matrices. Herein, since the single matrix is intended for an open-loop system, the number of factors/matrices for precoding of a closed-loop system becomes 6. A codebook for 4 Tx antennas as shown in Table 6 has 64 precoding vectors/matrices.

The codebooks described above have common features such as a constant modulus (CM) property, a nested property, constrained alphabet and the like. According to the CM property, no element in the precoding matrices in a codebook includes '0', and the respective elements have the same size. The nested property means that a precoding matrix of a lower rank is designed to be configured as a subset of a specific column of a precoding matrix of a higher rank. The constrained alphabet means that the respective elements in all precoding matrices in a codebook are constrained. For example, the elements of a precoding matrix may be constrained to elements (±1) used for binary phase shift keying (BPSK), elements (±1,±j) used for quadrature phase shift keying (QPSK), or elements $$\left\{\pm 1, \pm j, \pm \frac{(1+j)}{\sqrt{2}}, \pm \frac{(-1+j)}{\sqrt{2}}\right\}$$

used for 8-PSK. In the example codebook of Table 6, since the alphabet of the respective elements of all precoding matrices in the codebook is configured by $$\left\{\pm 1, \pm j, \pm \frac{(1+j)}{\sqrt{2}}, \pm \frac{(-1+j)}{\sqrt{2}}\right\},$$

the codebook may be considered as having the constrained alphabet property.

Configuration of Multiple Antennas

FIG. 6 illustrates configuration of 8 transmit (Tx) antennas.

FIG. 6(a) illustrates a case where N antennas constitute independent channels without being grouped. This antenna array is typically called a uniform linear array (ULA). When the number of antennas is small, the ULA configuration may be used. However, if the number of antennas is large, space for the transmitter and/or receiver may not be sufficient to spatially separate and dispose the multiple antennas to configure independent channels.

FIG. 6(b) illustrates a paired ULA configured by pairing every two antennnas In this case, an associated channel may be shared by a pair of two channels and be independent from the channels of other pairs of channels.

In contrast with legacy 3GPP LTE Release-8/9, which employs 4 Tx antennas for downlink, 3GPP LTE Release-10 or later systems may employ 8 Tx antennas for downlink. To use such extended antenna configuration, multiple Tx antennas need to be installed in an insufficient space, and accordingly the ULA antenna configuration as shown in FIGS. 6(a) and 6(b) may not be appropriate. Accordingly, a dual-pole (or cross-pole or cross polarization) antenna configuration as shown in FIG. 6(c) may be applied. If Tx antennas are configured in this way, independent channels may be configured by lowering correlation of antennas even if the distance d between the antennas is relatively short, and therefore data transmission with high throughput may be possible.

Double Code Book

In a more enhanced communication system such as LTE-A, obtaining an additional multi-user diversity using MU-MIMO (multi-user MIMO) has been added. To this end, higher accuracy is required in terms of channel feedback. This is because, since an interference channel exists between UEs multiplexed in antenna domain in MU-MIMO, feedback channel accuracy has a great effect not only on a feedback UE but also on interference of a different UE. Hence, LTE-A has decided to design final PMI to be divided into $W_1$ corresponding to long term and/or wideband PMI and $W_2$ corresponding to short term and/or subband PMI. In other word, the final PMI is expressed by a function of the $W_1$ and the $W_2$. For example, the final PMI W can be defined as follows: $W=W_1*W_2$ or $W=W_2*W_1$. Hence, in LTE-A, CSI can be configured by RI, $W_1$, $W_2$, and CQI.

As an example of a hierarchical codebook transformation scheme that configures a final PMI from two channel information, as shown in the following, it is able to transform a codebook using a long-term covariance matrix of a channel $$W = \text{norm}(W_1 W_2) \quad \text{[Equation 1]}$$

In Equation 1, $W_2$ corresponds to a codeword of a codebook which is generated to reflect short-term channel information, W corresponds to a codeword of a transformed final codebook, and norm (A) corresponds to a normalized matrix that norm of each row of a matrix A is normalized into 1.

Structures of the $W_1$ and the $W_2$ are described in the following in detail.

$$W^{(1)}(i) = \begin{bmatrix} X_i & 0 \\ 0 & X_i \end{bmatrix}, \text{ where } X_i \text{ is } Nt/2 \text{ by } M \text{ matrix.} \quad \text{[Equation 2]}$$

$$W^{(2)}(j) = \overbrace{\begin{bmatrix} e_M^k & e_M^l & e_M^m \\ \alpha_j e_M^k & \beta_j e_M^l & \cdots & \gamma_j e_M^m \end{bmatrix}}^{r \text{ columns}} \text{ (if rank = } r\text{),}$$

where $1 \leq k, l, m \leq M$ and $k, l, m \leq M$ and $k, l, m$ are integer.

When a cross polarized antenna is used and a space between antennas is dense (in general, when a distance between adjacent antennas is equal to or less than the half of a signal wavelength), a correlation characteristic of a channel may occur. The codeword structure corresponds to a structure to which the correlation characteristic is reflected. In case of the cross polarized antenna, antennas can be categorized into a horizontal antenna group and a vertical antenna group. Each antenna group has a characteristic of a ULA (uniform linear array) antenna and the two antenna groups are co-located. Hence, a correlation between antennas in each group has the same linear phase increment characteristic and a correlation between antenna groups has a characteristic that a phase is rotated. Since a codebook corresponds to a value resulted from quantizing a channel, it is necessary to design a codebook by reflecting a characteristic of a channel corresponding to a source as it is. For clarity, it may refer to a rank 1 codeword made by the aforementioned structure. The rank 1 codeword is shown in an equation described in the following. Referring to the rank 1 codeword, it is able to check that the channel characteristic is reflected to a codeword satisfying the equation 2.

$$W1(i) * W2(j) = \begin{bmatrix} X_i(k) \\ \alpha_j X_i(k) \end{bmatrix} \quad \text{[Equation 3]}$$

In the equation 3, a codeword is expressed by a vector of $N_t$ (number of transmission antennas) by 1 and the codeword is structured by two vectors including a high vector $X_i(k)$ and a low vector $a_j X_i(k)$. The high vector and the low vector show a correlation characteristic of a horizontal antenna group and a correlation characteristic of a vertical antenna group, respectively. The high vector $X_i(k)$ has a merit in that it is able to express a vector having a linear phase increment by reflecting a correlation characteristic between antennas of each antenna group. As a representative example, it may use a DFT (discrete Fourier transform) matrix.

CSI Reporting

In the 3GPP LTE(-A) system, a user equipment (UE) is defined to report CSI to a BS. Herein, the CSI collectively refers to information indicating the quality of a radio channel (also called a link) created between a UE and an antenna port. The CSI includes, for example, a rank indicator (RI), a precoding matrix indicator (PMI), and a channel quality indicator (CQI). Herein, the RI, which indicates rank information about a channel, refers to the number of streams that a UE receives through the same time-frequency resource. The RI value is determined depending on long-term fading of the channel, and is thus usually fed back to the BS by the UE with a longer period than for the PMI and CQI. The PMI, which has a value reflecting the channel space property, indicates a precoding index preferred by the UE based on a metric such as SINR. The CQI, which has a value indicating the intensity of a channel, typically refers to a receive SINR which may be obtained by the BS when the PMI is used.

The UE calculates, based on measurement of the radio channel, a preferred PMI and RI from which an optimum or highest transmission rate may be derived when used by the BS in the current channel state, and feeds back the calculated PMI and RI to the BS. Herein, the CQI refers to a modulation and coding scheme providing an acceptable packet error probability for the PMI/RI that is fed back.

In the 3GPP LTE(-A) system, an uplink channel used for CSI transmission is configured as shown in Table 7.

TABLE 7

| Scheduling scheme | Periodic CSI transmission | Aperiodic CSI transmission |
| --- | --- | --- |
| Frequency non-selective | PUCCH | — |
| Frequency selective | PUCCH | PUSCH |

Referring to Table 7, CSI may be transmitted with a periodicity defined in a higher layer, using a physical uplink control channel (PUCCH). When needed by the scheduler, a physical uplink shared channel (PUSCH) may be aperiodically used to transmit the CSI. Transmission of the CSI over the PUSCH is possible only in the case of frequency selective scheduling and aperiodic CSI transmission. Hereinafter, CSI transmission schemes according to scheduling schemes and periodicity will be described.

1) Transmitting the CQI/PMI/RI over the PUSCH after receiving a CSI transmission request control signal (a CSI request)

A PUSCH scheduling control signal (UL grant) transmitted over a PDCCH may include a control signal for requesting transmission of CSI. The table below shows modes of the UE in which the CQI, PMI and RI are transmitted over the PUSCH.

TABLE 8

| | | PMI Feedback Type | | |
| --- | --- | --- | --- | --- |
| | | No PMI | Single PMI | Multiple PMIs |
| PUSCH CQI Feedback Type | Wideband (Wideband CQI) | Mode 2-0 RI (only for Open-loop SM) 1st wideband CQI(4 bit) + Best-M CQI(2 bit) | Mode 3-1 RI 1st wideband CQI(4 bit) + N*subbandCQI(2 bit) 2nd wideband | Mode 1-2 RI 1st wideband CQI(4 bit) 2nd wideband CQI(4 bit) |
| | UE selected (Subband CQI) | | | |
| | Higher Layer-configured | | | |

TABLE 8-continued

| | PMI Feedback Type | | |
|---|---|---|---|
| | No PMI | Single PMI | Multiple PMIs |
| (Subband CQI) | (Best-M CQI: An average CQI for M SBs selected from among N SBs) Best-M index (L bit) Mode 3-0 RI (only for Open-loop SM) 1st wideband CQI(4 bit) + N*subbandCQI(2 bit) | CQI(4 bit) + N*subbandCQI(2 bit) if RI > 1 Wideband PMI(4 bit) (if 8Tx Ant, wideband W2 + wideband W1) | if RI > 1 N*Subband PMI(4 bit) (N is the total # of subbands) (if 8Tx Ant, N*subband W2 + wideband W1) Mode 2-2 RI 1st wideband CQI(4 bit) + Best-M CQI(2 bit) 2nd wideband CQI(4 bit) + Best-M CQI(2 bit) if RI > 1 Best-M index (L bit) Wideband PMI(4 bit) + Best-M PMI(4 bit) (if 8Tx Ant, wideband W2 + Best-M W2 + wideband W1) Mode 3-2 RI 1st wideband CQI(4 bit) + N*subbandCQI(2 bit) 2nd wideband CQI(4 bit) + N*subbandCQI(2 bit) if RI > 1 N*Subband PMI(4 bit) (N is the total # of subbands) (if 8Tx Ant, N*subband W2 + wideband W1) |

The transmission modes in Table 8 are selected in a higher layer, and the CQI/PMI/RI are all transmitted in a PUSCH subframe. Hereinafter, uplink transmission methods for the UE according to the respective modes will be described.

Mode 1-2 represents a case where precoding matrices are selected on the assumption that data is transmitted only in subbands. The UE generates a CQI on the assumption of a precoding matrix selected for a system band or a whole band (set S) designated in a higher layer. In Mode 1-2, the UE may transmit a CQI and a PMI value for each subband. Herein, the size of each subband may depend on the size of the system band.

A UE in Mode 2-0 may select M preferred subbands for a system band or a band (set S) designated in a higher layer. The UE may generate one CQI value on the assumption that data is transmitted for the M selected subbands. Preferably, the UE additionally reports one CQI (wideband CQI) value for the system band or set S. If there are multiple codewords for the M selected subbands, the UE defines a CQI value for each codeword in a differential form.

In this case, the differential CQI value is determined as a difference between an index corresponding to the CQI value for the M selected subbands and a wideband (WB) CQI index.

The UE in Mode 2-0 may transmit, to a BS, information about the positions of the M selected subbands, one CQI value for the M selected subbands and a CQI value generated for the whole band or designated band (set S). Herein, the size of a subband and the value of M may depend on the size of the system band.

A UE in Mode 2-2 may select positions of M preferred subbands and a single precoding matrix for the M preferred subbands simultaneously on the assumption that data is transmitted through the M preferred subbands. Herein, a CQI value for the M preferred subbands is defined for each codeword. In addition, the UE additionally generates a wideband CQI value for the system band or a designated band (set S).

The UE in Mode 2-2 may transmit, to the BS, information about the positions of the M preferred subbands, one CQI value for the M selected subbands and a single PMI for the M preferred subbands, a wideband PMI, and a wideband CQI value. Herein, the size of a subband and the value of M may depend on the size of the system band.

A UE in Mode 3-0 generates a wideband CQI value. The UE generates a CQI value for each subband on the assumption that data is transmitted through each subband. In this case, even if RI>1, the CQI value represents only the CQI value for the first codeword.

A UE in Mode 3-1 generates a single precoding matrix for the system band or a designated band (set S). The UE generates a CQI subband for each codeword on the assumption of the single precoding matrix generated for each subband. In addition, the UE may generate a wideband CQI on the assumption of the single precoding matrix. The CQI value for each subband may be expressed in a differential form. The subband CQI value is calculated as a difference between the subband CQI index and the wideband CQI index. Herein, the size of each subband may depend on the size of the system band.

A UE in Mode 3-2 generates a precoding matrix for each subband in place of a single precoding matrix for the whole band, in contrast with the UE in Mode 3-1.

2) Periodic CQI/PMI/RI transmission over PUCCH

The UE may periodically transmit CSI (e.g., CQI/PMI/PTI (precoding type indicator) and/or RI information) to the BS over a PUCCH. If the UE receives a control signal instructing transmission of user data, the UE may transmit a CQI over the PUCCH. Even if the control signal is transmitted over a PUSCH, the CQI/PMI/PTI/RI may be transmitted in one of the modes defined in the following table.

TABLE 9

|  |  | PMI feedback type | |
| --- | --- | --- | --- |
|  |  | No PMI | Single PMI |
| PUCCH CQI feedback type | Wideband (wideband CQI) | Mode 1-0 | Mode 1-1 |
|  | UE selective (subband CQI) | Mode 2-0 | Mode 2-1 |

Figure 9:
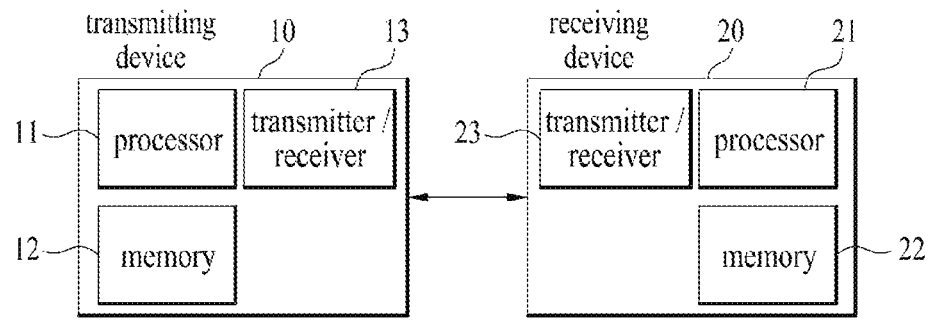
FIG. 9 is a block diagram of a device for implementing embodiment(s) of the present invention.

A UE may be set in transmission modes as shown in FIG. 9. Referring to FIG. 9, in Mode 2-0 and Mode 2-1, a bandwidth part (BP) may be a set of subbands consecutively positioned in the frequency domain, and cover the system band or a designated band (set S). In Table 9, the size of each subband, the size of a BP and the number of BPs may depend on the size of the system band. In addition, the UE transmits CQIs for respective BPs in ascending order in the frequency domain so as to cover the system band or designated band (set S).

The UE may have the following PUCCH transmission types according to a transmission combination of CQI/PMI/PTI/RI.

i) Type 1: the UE transmits a subband (SB) CQI of Mode 2-0 and Mode 2-1.

ii) Type 1a: the UE transmits an SB CQI and a second PMI.

iii) Types 2, 2b and 2c: the UE transmits a WB-CQI/PMI.

iv) Type 2a: the UE transmits a WB PMI.

v) Type 3: the UE transmits an RI.

vi) Type 4: the UE transmits a WB CQI.

vii) Type 5: the UE transmits an RI and a WB PMI.

viii) Type 6: the UE transmits an RI and a PTI.

ix) Type 7: theUE transmits a CRI(CSI-RS resource indicator) and an RI.

x) Type 8: the UE transmits a CRI, an RI and a WB PMI.

xi) Type 9: the UE transmits a CRI, an RI and a PTI (precoding type indication).

xii) Type 10: the UE transmits a CRI.

When the UE transmits an RI and a WB CQI/PMI, the CQI/PMI are transmitted in subframes having different periodicities and offsets. If the RI needs to be transmitted in the same subframe as the WB CQI/PMI, the CQI/PMI are not transmitted.

Aperiodic CSI Request

If a carrier aggregation (CA) environment is considered, a 2-bit CSI request field is used in DCI format 0 or 4, for an aperiodic CSI feedback in the current LTE standards. If a plurality of serving cells are configured for a UE in the CA environment, the UE interprets the CSI request field in 2 bits. If one of TM 1 to TM 9 is configured for every component carrier (CC), an aperiodic CSI feedback is triggered according to values listed in Table 8 below. If TM 10 is configured for at least one of all CCs, an aperiodic CSI feedback is triggered according to values listed in Table 9 below.

TABLE 8

| Values of CSI request field | Description |
| --- | --- |
| '00' | Aperiodic CSI reporting is not triggered |
| '01' | Aperiodic CSI reporting is triggered for serving cell |
| '10' | Aperiodic CSI reporting is triggered for a first set of serving cells configured by higher layer |
| '11' | Aperiodic CSI reporting is triggered for a second set of serving cells configured by higher layer |

TABLE 9

| Values of CSI request field | Description |
| --- | --- |
| '00' | Aperiodic CSI reporting is not triggered |
| '01' | Aperiodic CSI reporting is triggered for CSI process set configured for serving cell by higher layer |
| '10' | Aperiodic CSI reporting is triggered for a first set of CSI processes configured by higher layer |
| '11' | Aperiodic CSI reporting is triggered for a second set of CSI processes configured by higher layer |

A wireless communication system appearing after LTE Rel-12 considers introducing an antenna system utilizing an active antenna system (hereinafter, AAS). Since the AAS corresponds to a system that each antenna is configured as an active antenna including an active circuit, the AAS is expected as a technology capable of reducing interference by changing an antenna pattern in accordance with a situation and the technology capable of more efficiently performing beamforming. When the AAS is configured as a two-dimensional AAS (2D-AAS), it is possible to more actively change a transmission beam according to a position of a receiving end by more efficiently and three-dimensionally adjusting a main lobe of an antenna in terms of antenna pattern. As shown in FIG. 5, since the 2D-AAS arranges antennas in vertical direction and horizontal direction, it is anticipated that a massive antenna system is to be constructed. A transmission/reception scheme performed according to the introduction/use of the 2D-AAS is referred to as EB (elevation beamforming)/FD (full dimension)-MIMO.

[Class A CSI Reporting]

In FD-MIMO system, a base station can set a plurality of CSI-RS resources belonging to a single CSI process to a UE. The UE does not consider the CSI-RS resources configured within a single CSI process as an independent channel. The UE assumes the resources as a single huge CSI-RS resource by aggregating the resources. The UE calculates CSI based on the single huge CSI-RS resource and feed backs the calculated CSI. For example, if the base station sets three 4-port CSI-RS resources belonging to a single CSI process to the UE, the UE assumes one 12-port CSI-RS resource by aggregating the three 4-port CSI-RS resources. The UE calculates CSI based on the 12-port CSI-RS resource using 12-port PMI and feed backs the calculated CSI.

[Class B CSI Reporting]

In FD-MIMO system, a base station can set a plurality of CSI-RS resources belonging to a single CSI process to a UE. For example, the base station can configure 8 CSI-RS resources within a single CSI process. Each of 8 CSI-RS resources can be configured by 4-port CSI-RS. It may apply different beamforming by applying different virtualization to each of 8 4-port CSI-RSs. For example, vertical beamforming is applied to a first CSI-RS with a zenith angle of 100 degrees. Since CSI-RSs are configured with a zenith angle difference of 5 degrees, vertical beamforming can be applied to an $8^{th}$ CSI-RS with a zenith angle of 135 degrees.

A UE assumes each of the CSI-RS resources as an independent channel and selects one from among the CSI-RS resources. The UE calculates and reports CSI on the basis of the selected resource. In particular, the UE selects a CSI-RS of a strong channel from among the 8 CSI-RS resources, calculates CSI on the basis of the selected CSI-RS, and reports the CSI to the base station. In this case, the UE additionally reports the selected CSI-RS to the base station via a CRI (CSI-RS resource indicator) value. For example, if a channel of the first CSI-RS is strongest, the UE configures CRI=0 and reports the first CSI-RS to the base station.

In order to effectively show the aforementioned characteristic, a variable described in the following can be defined for a CSI process in the class B. K corresponds to the number of CSI-RS resources existing in a CSI process. $N_k$ corresponds to the number of CSI-RS ports of a $k^{th}$ CSI-RS resource. In the aforementioned example, K corresponds to 8 and $N_k$ is configured by 4 irrespective of a value of k.

[LC Codebook-based Channel State Reporting]

Meanwhile, when FD-MIMO is used to more accurately report a channel state, it has been decided to use a linear combination (LC) instead of a legacy double codebook.

The LC codebook corresponds to a combination of a linear combination of a given base vector and a co-phase between antenna polarizations. The LC codebook has a structure that a terminal informs a base station of a channel characteristic. In this case, the co-phase corresponds to a phase difference between antenna groups having a different polarization characteristic. In FIG. 6 (c), the co-phase corresponds to a phase difference between antenna ports that cross each other. According to related art, when a cross polarized antenna is used, the cross polarized antenna is designed to have a linear phase increment between antennas that cross each other.

In the LC codebook, a precoder vector of rank 1 can be made as follows.

$$w = \sum_{l=0}^{L-1} c_l a_l = \sum_{l=0}^{L-1} c_l \begin{bmatrix} w_l \\ e^{j\phi_l} w_l \end{bmatrix}$$ [Equation 4]

$\{W_l\}$ is a set of the L number of basis vectors selected from a master set. Hence, the $W_l$ can be decomposed as KP: $W_l = W_H(h_l) \otimes W_V(v_l)$ is satisfied. $W_H(h_l)$ and $W_V(v_l)$ have a size of N by 1 and $M_{TRXU}$ 1, respectively. The $W_H(h_l)$ and the $W_V(v_l)$ respectively correspond to an azimuth response and an elevation channel response for an azimuth angle and an elevation angle.

$\{\phi_l\}$ corresponds to cross-polarized co-phase values for the L number of basis vectors selected from a co-phase codebook $C_{co\text{-}ph}$.

$\{c_l\}$ corresponds to a set of complex LC coefficients selected from a coefficient codebook $C_{coeff}$.

In particular, it is able to create environment capable of using a more accurate beam in such environment using a narrow beam as FD-MIMO. And, it may be able to report more accurate channel environment for a purpose such as a multi-user operation and the like. Since it is able to reflect an explicit channel characteristic, it may expect performance better than legacy LTE codebook-based feedback. In this case, a codeword for reporting a channel characteristic via an LC codebook is referred to as an LC codeword.

An LC codeword can include three parameters (or elements) including a co-phase between antenna polarizations, a phase, and power (or size). The co-phase corresponds to the $\{\phi_l\}$ and the phase and the power (or size) correspond to a phase and power of the $\{c_l\}$, respectively. In particular, the LC codeword is reported by including each of the three elements or at least two elements among the three elements. To this end, it is able to define two or more feedback instances. In particular, the co-phase can be transmitted via $W_2$ (i.e., second PMI). If it is configured to use the same co-phase over all LC coefficients, the co-phase can be reported with a smaller phase interval such as 8PSK phase instead of a legacy QPSK phase.

For clarity, although it is briefly described as an LC codeword, the LC codeword corresponds to a phase, power, or a co-phase. Or, the LC codeword may correspond to a combination thereof.

It is able to design an LC codeword in consideration of non-linearity of verticality and horizontality. In this case, the LC codeword can generate W by combining matrixes that use a plurality of LC codewords for a different dimension such as verticality and horizontality. In this case, only a part of the matrixes can be designed using the LC codeword in consideration of the non-linearity. For example, the entire W matrix is generated in a manner that a $W_H$ matrix is generated in horizontal direction only using the abovementioned method and a Wv matrix not using the LC is generated in vertical direction.

Similar to grassmannian codebook, a predetermined vector set is shared by a base station and a user equipment to generate a precoder using a basis vector. Or, in order to reduce feedback overhead, it may set a limit on a specific subset of a basis vector set and the UE can report a linear combination using a precoder belonging to the subset only to the base station. The limit set to the subset can be performed by the base station via signaling such as RRC or DCI. If the limit set to the subset is performed by the UE, $W_1$ (i.e., first PMI) reporting of a legacy LTE codebook structure can perform the limitation function of the basis vector set. A reporting scheme for an LC codebook may operate as follows.

● Periodic reporting
■ Feedback instance
♦ Independent feedback

When an LC codeword intends to reflect a characteristic of an explicit channel, since it is advantageous to have the large number of bits for LC feedback, it is preferable to perform a reporting scheme using an independent feedback instance rather than joint feedback with different CSI. In this case, characteristics of a reporting instance for LC feedback are described in the following.

⊙ Short period (e.g., reporting period of LC <= reporting period of legacy $W_2$)

An LC codeword can be reported with a short period. This method can be used for case that a channel characteristic is changed with a short period via LC. The method provides biggest flexibility to a UE and a base station. In this case, a transmission period of CQI can be configured to be equal to or less than a reporting period of an LC codeword.

In order to reduce feedback overhead, the number of feedback bits of the LC codeword can be restricted to a small number.

⊙ Medium period (e.g., reporting period of legacy $W_2$ < reporting period of LC < reporting period of legacy $W_1$)

An LC codeword can be reported with a medium period. When a co-phase term is transmitted instead of legacy second PMI at a reporting instance of $W_2$, the co-phase term can be transmitted with a longer period compared to a co-phase term transmitted with a short period. In this case, CQI can still be reported together with $W_2$ feedback.

⊙ Long period (e.g., reporting period of LC >= reporting period of $W_1$)

Due to the characteristic of LC, it is not preferable to perform reporting with a long period. Hence, when an LC codeword is reported (when $W_1$ is reported), it is necessary not to report the LC codeword with a period longer than a period of the $W_1$. It may apply a method of reporting the LC codeword together with the W1 (joint encoding, etc.) at the same timing (e.g., same period).

♦ Joint feedback with other CSIs

It may perform transmission by performing joint encoding with other CSIs (e.g., RI, CRI, PMI, CQI) currently used in LTE. In this case it may perform joint feedback with CSI having a similar or identical property to achieve a purpose identical to the purpose mentioned earlier in the independent feedback case.

■ Target band
♦ Wideband

⊙ An LC codeword can be reported to a wideband. In particular, when large feedback bits are necessary, it may apply an LC codebook in a wideband reporting mode only.

⊙ A part of elements of an LC codeword can be commonly used as a wideband and the remaining elements can be used as a subband. In particular, a part of an LC codeword can be reported according to a wideband and the remaining of the LC codeword can be reported according to a subband. For example, among a size and a phase of $\{c_i\}$, the size (or phase) is commonly used in wideband and the phase (or size) and a co-phase can be configured to be fed back to a subband. By doing so, it is able to determine an appropriate level in consideration of a tradeoff relation between feedback overhead and performance. Information on whether a variable (e.g., size, phase) for the $\{c_i\}$ is reported to a wideband or a subband can be indicated/set to a UE. It may be able to provide a corresponding configuration to a UE via RRC signaling in a CSI feedback configuration related to a corresponding CSI process.

♦ Middle band

⊙ A target of an LC codeword can be configured in a unit of a subband group instead of a wideband. By doing so, it may expect a bigger interference suppression effect compared to reporting in a subband unit. The subband group may not have a mutually common subband (i.e., disjoint) and can be set to a UE via higher layer signaling such as RRC.

♦ Subband

⊙ It may be able to configure all elements of an LC codeword to be reported in a subband unit. In particular, in order to obtain better performance in multi-user environment, it may be able to configure reporting to be performed in a subband unit. In this case, if feedback is periodically performed, it may bring about considerable overhead. Hence, it may use a small feedback bit and report the periodic feedback together with subband CQI.

♦ Narrowband (e.g., a band in a unit of 1RB)

It may be able to allow feedback in a unit of a narrow band narrower than a subband defined in LTE. The feedback in a unit of a narrowband may have excellent performance in environment such as MU and the like. However, if feedback is periodically performed, it may bring about considerable overhead. In this case, it may report CQI on a narrow band instead of a subband.

■ Support aperiodic reporting only
♦ It may be able to configure an LC codeword to be aperiodically reported only.

■ When an LC codeword is reported, if PUCCH (format 2) payload is not sufficient, it may be able to configure a UE to use a PUCCH format 3 or a different PUCCH format providing a container size equal to or greater than a container size of the PUCCH format 3 (i.e., although other periodic CSI reporting uses a PUCCH format 2). Or, the UE can perform reporting by configuring/using periodic PUSCH feedback.

● Aperiodic feedback
■ Target band
♦ Wideband

⊙ CQI targeting a wideband is calculated using an LC codeword and the calculated CQI is transmitted to a base station.

♦ Middle band

⊙ A target of an LC codeword can be configured in a unit identical to a subband group. By doing so, it may expect a bigger interference suppression effect compared to reporting in a subband unit. The subband group may not have a mutually common subband (i.e., disjoint) and can be set to a UE via higher layer signaling such as RRC.

♦ Subband

⊙ It may be able to configure all elements of an LC codeword to be reported in a subband unit. In particular, in order to obtain better performance in multi-user environment, it may be able to configure reporting to be performed in a subband unit. Since aperiodic feedback is reported via PUSCH, the aperiodic feedback has less restriction in a payload size compared to periodic feedback.

♦ Narrowband (e.g., a band in a unit of 1 RB)

It may be able to allow feedback in a unit of a narrow band narrower than a subband defined in LTE. The feedback in a unit of a narrowband may have excellent performance in environment such as MU and the like. In this case, since aperiodic feedback is reported via PUSCH, the aperiodic feedback has less restriction in a payload size compared to periodic feedback. In this case, it may report CQI on a narrow band instead of a subband.

■ PUSCH mapping method
♦ It may be able to define/configure PUSCH to be mapped to a region to which CQI/PMI is mapped. For example, it may be able to configure a concatenation form in a bit level. $\{c_i\}$ and PMI (or PMI and $\{c_i\}$), and CQI are concatenated and then encoding is performed. If an element of an LC codeword is defined/configured to perform wideband feedback, the element of the LC codeword can be mapped to a region to which an RI is mapped. In this case, it may be able to configure a concatenation form (in a bit level). An LC codeword (e.g., power and phase of the LC codeword) and (CRI and) RI are concatenated and then encoding is performed. An order of the abovementioned concatenation can be exchanged.
- Support aperiodic CSI-RS only It may be able to configure reporting using an LC codeword to be performed only when CSI feedback is performed on an aperiodic CSI-RS (e.g., when a CSI-RS configuration interlocked with a CSI process to which CSI reporting including the LC codeword is set corresponds to an aperiodic CSI-R configuration).

[Delta-matrix Feedback for More Feedback Precision]

In order to reflect a channel characteristic, it may use a more simplified channel reporting method. The method corresponds to a method of more realistically reporting a phase increment of a codeword while being included in a current codebook feedback structure basically using a DFT (discrete Fourier transform) vector. The method is described in the following. It may use a codebook structure of a form described in the following.

$$DW_1W_2 = \begin{bmatrix} D_1 & 0 \\ 0 & \beta D_2 \end{bmatrix} W_1 W_2 \quad \text{[Equation 5]}$$

The method corresponds to a method of additionally making a feedback on a matrix D to a legacy codebook structure.

It may be able to introduce non-linear increment instead of legacy constant phase increment via a D matrix. For example, $$D_1 = \left\{ \begin{bmatrix} 1 & 0 & 0 & 0 \\ 0 & 1 & 0 & 0 \\ 0 & 0 & 1 & 0 \\ 0 & 0 & 0 & 1 \end{bmatrix}, \begin{bmatrix} 1 & 0 & 0 & 0 \\ 0 & e^{j\delta} & 0 & 0 \\ 0 & 0 & 1 & 0 \\ 0 & 0 & 0 & e^{-j\delta} \end{bmatrix}, \begin{bmatrix} 1 & 0 & 0 & 0 \\ 0 & 1 & 0 & 0 \\ 0 & 0 & e^{j\delta} & 0 \\ 0 & 0 & 0 & e^{j2\delta} \end{bmatrix}, \ldots \right\}.$$

δ can be selected from a specific set. For example, the δ can be selected from among {0°, 5°, −5°}. In order to achieve precise feedback, a value illustrated by 5° can be configured to be smaller than a minimum value of a phase difference that construct $W_1$ and $W_2$.

It may be able to break constant modulus of a codeword via the D matrix. In the example above, although a size of each element of the D matrix is set to 1, it may be able to reflect power of a channel by differentiating the size.

It may be able to define/configure a form restricted to $D_1=D_2$ in consideration of a cross-polarized antenna structure.

A legacy co-phase term can be adjusted in a smaller unit by reporting β.

The β can be selected from a specific set. For example, the β can be selected from among {0, π/4}. In order to achieve precise feedback, a value illustrated by π/4 can be configured to be smaller than an interval of a co-phase used in $W_2$ of LTE. Or, it may be able to implicitly configure a different co-phase term according to an index of a codeword which is determined by $W_1$ and $W_2$. In this case, it may be able to use a phase interval smaller than the minimum granularity of the co-phase term used in the abovementioned method.

In the foregoing description, a method of generating a codebook for a rank 1 has been described. If a rank is equal to or higher than a rank 2, it may consider options described in the following.

Option 1. The same D matrix is applied to each layer. This option has the least feedback overhead.

Option 2. A different D matrix is applied to each layer. In particular, for rank 3 feedback, it is necessary to report three D matrixes. This option is most flexible and has the biggest feedback overhead.

Option 3. Each of orthogonal beam groups uses a different D matrix. For example, a rank 4 codeword is selected as follows.

$$\begin{bmatrix} X & Y & X & Y \\ \alpha X & \alpha Y & -\alpha X & -\alpha Y \end{bmatrix} \quad \text{[Equation 6]}$$

This includes orthogonal beams expressed by X and Y and a co-phase terms expressed by α. In this case, a D matrix applied to X group $$\left\{ \begin{bmatrix} X \\ \alpha X \end{bmatrix}, \begin{bmatrix} X \\ -\alpha X \end{bmatrix} \right\}$$

and a D matrix applied to Y group $$\left\{ \begin{bmatrix} Y \\ \alpha Y \end{bmatrix}, \begin{bmatrix} Y \\ -\alpha Y \end{bmatrix} \right\}$$

are individually reported.

Option 4. A different D matrix is used for codewords using the same co-phase. In the example above, a D matrix applied to $$\left\{ \begin{bmatrix} X \\ \alpha X \end{bmatrix}, \begin{bmatrix} Y \\ \alpha Y \end{bmatrix} \right\}$$

group and a D matrix applied to $$\left\{ \begin{bmatrix} X \\ -\alpha X \end{bmatrix}, \begin{bmatrix} Y \\ -\alpha Y \end{bmatrix} \right\}$$

are individually reported. In this case, β should be the same for the two D matrixes.

It is able to design a D matrix in consideration of non-linearity of vertical and horizontal. For example, it can be represented as follows.

$$D_{\cdot} = D_{\cdot} \otimes D_{\cdot\_} \quad \text{[Equation 7]}$$

The method above can be identically used for a method of generating a D matrix by combining a plurality of matrixes for a different dimension such as vertical and horizontal. In this case, only a part of a matrix can be designed using a D matrix in consideration of non-linearity. For example, a design method of a $D_{1H}$ matrix is applied to horizontal direction only using the aforementioned method and a D matrix can be generated using an identity matrix (i.e., $Div_{1V}=I$) in vertical direction.

In the following, a method of reporting a channel state using the D matrix is explained.
- Periodic reporting
  ■ Feedback instance
    ◆ Independent feedback In case of a D matrix, it is advantageous to use a reporting method using an independent feedback instance compared to joint feedback with different CSI. In this case, a characteristic of a reporting instance for the D matrix is described in the following.

⊙ Short period (e.g., reporting period of LC <= reporting period of legacy $W_2$)

D matrix can be reported with a short period. This method can be used for case that a channel characteristic is changed with a short period via the D matrix. The method provides biggest flexibility to a UE and a base station. In this case, a transmission period of CQI can be configured to be equal to or less than a reporting period of the D matrix.

In order to reduce feedback overhead, the number of feedback bits of the D matrix can be restricted to a small number.

⊙ Medium period (e.g., reporting period of legacy $W_2$ < reporting period of D matrix < reporting period of legacy $W_1$)

D matrix can be reported with a medium period. When a co-phase term is transmitted instead of legacy second PMI at a reporting instance of $W_2$, the co-phase term can be transmitted with a longer period compared to a co-phase term transmitted with a short period. In this case, CQI can still be reported together with $W_2$ feedback.

⊙ Long period (e.g., reporting period of D matrix >= reporting period of $W_1$)

Due to the characteristic of D matrix, it is not preferable to perform reporting with a long period. Hence, when a D matrix is reported (when $W_1$ is reported), it is necessary not to report the D matrix with a period longer than a period of the $W_1$. It may apply a method of reporting the D matrix together with the W1 (joint encoding, etc.) at the same timing (e.g., same period).

♦ Joint feedback with other CSIs

It may perform transmission by performing joint encoding with other CSIs (e.g., RI, CRI, PMI, CQI) currently used in LTE. In this case, it may perform joint feedback with CSI having a similar or identical property to achieve a purpose identical to the purpose mentioned earlier in the independent feedback case.

■ Target band

♦ Wideband

⊙ D matrix can be reported to a wideband. In particular, when large feedback bits are necessary, it may apply D matrix in a wideband reporting mode only.

⊙ A part of elements of D matrix can be commonly reported to a wideband and the remaining elements can be reported to a subband. For example, among a size and a phase of D elements, the size (or phase) is commonly used in wideband and the phase (or size) and a co-phase can be configured to be fed back to a subband. By doing so, it is able to determine an appropriate level in consideration of a tradeoff relation between feedback overhead and performance Information on whether an element (e.g., size, phase) for the D matrix is reported to a wideband or a subband can be indicated/set to a UE. It may be able to provide a corresponding configuration to a UE via RRC signaling in a CSI feedback configuration related to a corresponding CSI process.

♦ Middle band

⊙ A target of D matrix can be configured in a unit of a subband group instead of a wideband. By doing so, it may expect a bigger interference suppression effect compared to reporting in a subband unit. The subband group may not have a mutually common subband (i.e., disjoint) and can be set to a UE via higher layer signaling such as RRC.

♦ Subband

⊙ It may be able to configure all elements of D matrix to be reported in a subband unit. In particular, in order to obtain better performance in multi-user environment, it may be able to configure reporting to be performed in a subband unit. In this case, if feedback is periodically performed, it may bring about considerable overhead. Hence, it may use a small feedback bit and report the periodic feedback together with subband CQI.

♦ Narrow band (e.g., a band in a unit of 1 RB)

It may be able to allow feedback in a unit of a narrow band narrower than a subband defined in LTE. The feedback in a unit of a narrowband may have excellent performance in environment such as MU and the like. However, if feedback is periodically performed, it may bring about considerable overhead. In this case, it may report CQI on a narrow band instead of a subband.

■ Support aperiodic reporting only

♦ It may be able to configure D matrix to be aperiodically reported only.

■ When D matrix is reported, if PUCCH (format 2) payload is not sufficient, it may be able to configure a UE to use a PUCCH format 3 or a different PUCCH format providing a container size equal to or greater than a container size of the PUCCH format 3 (i.e., although other periodic CSI reporting uses a PUCCH format 2). Or, the UE can perform reporting by configuring/using periodic PUSCH feedback.

● Aperiodic feedback

■ Target band

♦ Wideband

⊙ CQI targeting a wideband is calculated using D matrix and the calculated CQI is transmitted to a base station.

♦ Middle band

⊙ A target of D matrix can be configured in a unit identical to a subband group. By doing so, it may expect a bigger interference suppression effect compared to reporting in a subband unit. The subband group may not have a mutually common subband (i.e., disjoint) and can be set to a UE via higher layer signaling such as RRC.

♦ Subband

⊙ It may be able to configure all elements of D matrix to be reported in a subband unit. In particular, in order to obtain better performance in multi-user environment, it may be able to configure reporting to be performed in a subband unit. Since aperiodic feedback is reported via PUSCH, the aperiodic feedback has less restriction in a payload size compared to periodic feedback.

♦ Narrow band (e.g., a band in a unit of 1 RB)

It may be able to allow feedback in a unit of a narrow band narrower than a subband defined in LTE. The feedback in a unit of a narrowband may have excellent performance in environment such as MU and the like. In this case, since aperiodic feedback is reported via PUSCH, the aperiodic feedback has less restriction in a payload size compared to periodic feedback. In this case, it may report CQI on a narrow band instead of a subband.

■ PUSCH mapping method

♦ It may be able to define/configure PUSCH to be mapped to a region to which CQI/PMI is mapped. For example, it may be able to configure a concatenation form in a bit level. A D matrix and PMI (or PMI and a D matrix), and CQI are concatenated and then encoding is performed. If an element of a D matrix is defined/configured to perform wideband feedback, the element of the D matrix can be mapped to a region to which an RI is mapped. In this case, it may be able to configure a concatenation form (in a bit level). A D matrix (e.g., power and phase of the D matrix) and (CRI and) RI are concatenated and then encoding is performed. An order of the abovementioned concatenation can be exchanged.

● Support aperiodic CSI-RS only

It may be able to configure reporting using a D matrix to be performed only when CSI feedback is performed on an aperiodic CSI-RS (e.g., when a CSI-RS configuration interlocked with a CSI process to which CSI reporting including the D matrix is set corresponds to an aperiodic CSI-R configuration).

Figure 8:
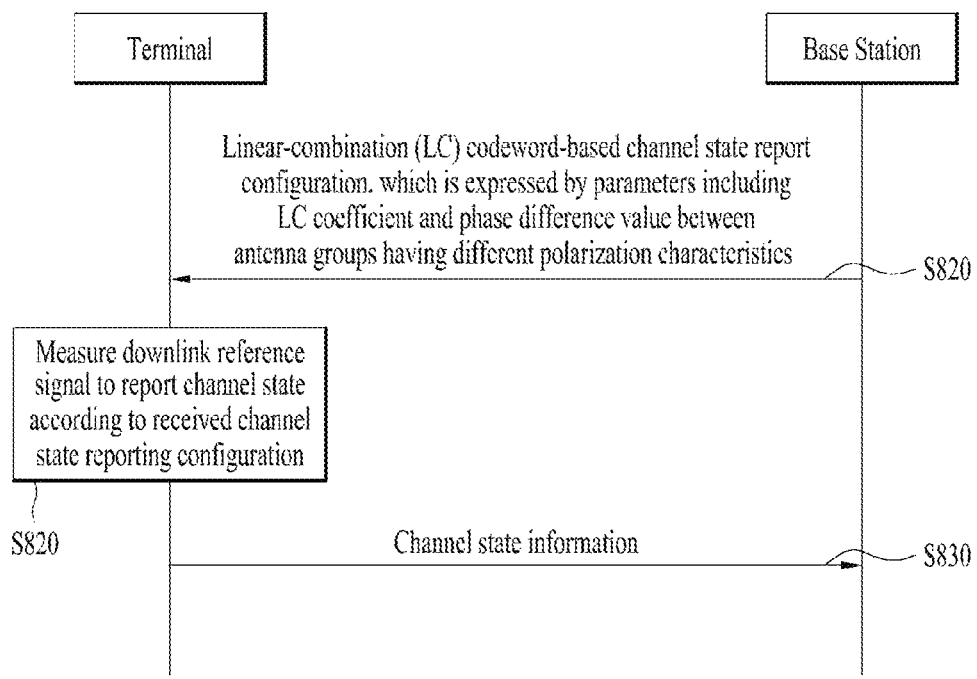
FIG. 8 is a flowchart illustrating an operation according to one embodiment of the present invention.

FIG. 8 is a flowchart illustrating an operation according to one embodiment of the present invention.

The operation corresponds to a method of reporting a channel state in a wireless communication system and can be performed by a UE.

The UE can receive linear-combination (LC) code word-based channel state reporting configuration, which is expressed by parameters including an LC coefficient and a phase difference (co-phase) value between antenna groups having mutually different polarization characteristics [S810]. The UE can measure a downlink reference signal to report a channel state according to the received channel state reporting configuration [S820]. The UE can transmit the LC codeword-based channel state report to a base station according to the measurement of the reference signal [S830].

The channel state report can include or indicate the LC coefficient and the co-phase value. Additionally or alternatively, the channel state report can include a size parameter or a phase parameter of the LC coefficient.

The UE can receive an indication or a configuration indicating information on whether or not the channel state report is configured by a wideband report from the base station.

Additionally or alternatively, the channel state report configuration can include an aperiodic channel state information request.

If the channel state report is triggered by the aperiodic channel state information request, the LC coefficient, which is transmitted as the channel state report, can be mapped to a bit of a channel quality indicator in a bit level in a manner of being concatenated to the bit of the channel quality indicator in a physical uplink data channel region to which the channel quality indicator is mapped.

If the channel state report is triggered by the aperiodic channel state information request and the LC coefficient, which is transmitted as the channel state report, is configured by wideband report, the LC coefficient can be mapped to a bit of a rank indicator in a bit level in a manner of being concatenated to the bit of the rank indicator in a physical uplink data channel region to which the rank indicator is mapped.

In the foregoing description, embodiments of the present invention have been briefly explained with reference to FIG. 8. An embodiment related to FIG. 8 can alternatively or additionally include at least a part of the aforementioned embodiments.

FIG. 9 is a block diagram of a transmitting device 10 and a receiving device 20 configured to implement exemplary embodiments of the present invention. Referring to FIG. 9, the transmitting device 10 and the receiving device 20 respectively include transmitter/receiver 13 and 23 for transmitting and receiving radio signals carrying information, data, signals, and/or messages, memories 12 and 22 for storing information related to communication in a wireless communication system, and processors 11 and 21 connected operationally to the transmitter/receiver 13 and 23 and the memories 12 and 22 and configured to control the memories 12 and 22 and/or the transmitter/receiver 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the transmitter/receiver 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transmitter/receiver 13 may include an oscillator. The transmitter/receiver 13 may include Nt (where Nt is a positive integer) transmit antennas.

A signal processing process of the receiving device 20 is the reverse of the signal processing process of the transmitting device 10. Under the control of the processor 21, the transmitter/receiver 23 of the receiving device 10 receives RF signals transmitted by the transmitting device 10. The transmitter/receiver 23 may include Nr receive antennas and frequency down-converts each signal received through receive antennas into a baseband signal. The transmitter/receiver 23 may include an oscillator for frequency down-conversion. The processor 21 decodes and demodulates the radio signals received through the receive antennas and restores data that the transmitting device 10 wishes to transmit.

The transmitter/receiver 13 and 23 include one or more antennas. An antenna performs a function of transmitting signals processed by the transmitter/receiver 13 and 23 to the exterior or receiving radio signals from the exterior to transfer the radio signals to the transmitter/receiver 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An transmitter/receiver supporting a MIMO function of transmitting and receiving data using a plurality of antennas may be connected to two or more antennas.

The transmitting device and/or the receiving device may be configured as a combination of one or more embodiments of the present invention.

The embodiments of the present application has been illustrated based on a wireless communication system, specifically 3GPP LTE (-A), however, the embodiments of the present application can be applied to any wireless communication system in which interferences exist.

It will be apparent to those skilled in the art that various modifications and variations can be made in the present invention without departing from the scope of the inventions. Thus, it is intended that the present invention covers the modifications and variations of this invention provided they come within the scope of the appended claims and their equivalents.

INDUSTRIAL APPLICABILITY

The present invention is applicable to wireless communication devices such as a terminal, a relay, and a base station.

What is claimed is:

1. A method of reporting a channel state, which is reported by a terminal in a wireless communication system, comprising:
   receiving linear-combination (LC) codeword-based channel state report configuration, which is expressed by parameters containing an LC coefficient and a phase difference (co-phase) value between antenna groups having different polarization characteristics;
   measuring a downlink reference signal to report a channel state according to the received channel state reporting configuration; and
   transmitting the LC codeword-based channel state report to a base station according to the measurement of the reference signal,
   wherein the channel state report supports a wideband reporting mode only.

2. The method of claim 1, wherein the channel state report includes or indicates the LC coefficient and the co-phase value.

3. The method of claim 1, wherein the channel state report includes a size parameter or a phase parameter of the LC coefficient.

4. The method of claim 1, further comprising receiving an indication or a configuration for whether or not the channel state report is configured by a wideband report from the base station.

5. The method of claim 1, wherein the channel state report configuration includes an aperiodic channel state information request.

6. The method of claim 5, wherein when the channel state report is triggered by the aperiodic channel state information request, the LC coefficient, which is transmitted as the channel state report, is mapped to a physical uplink data channel region to which a channel quality indicator is mapped in a manner of being concatenated to the bit of the channel quality indicator in a bit level.

7. The method of claim 5, wherein when the channel state report is triggered by the aperiodic channel state information request and the LC coefficient, which is transmitted as the channel state report, is configured by wideband report, the LC coefficient is mapped to a physical uplink data channel region to which a rank indicator is mapped in a manner of being concatenated to the bit of the rank indicator in a bit level.

8. A terminal configured to report a channel state in a wireless communication system, comprising:
   a transmitter;
   a receiver; and
   a processor that controls the transmitter and the receiver,
      the processor receives linear-combination (LC) codeword-based channel state report configuration, which is expressed by parameters containing an LC coefficient and a phase difference (co-phase) value between antenna groups having different polarization characteristics, measures a downlink reference signal to report a channel state according to the received channel state reporting configuration, and transmits the LC codeword-based channel state report to a base station according to the measurement of the reference signal,
   wherein the channel state report supports a wideband reporting mode only.

9. The terminal of claim 8, wherein the channel state report includes or indicates the LC coefficient and the co-phase value.

10. The terminal of claim 8, wherein the channel state report includes a size parameter or a phase parameter of the LC coefficient.

11. The terminal of claim 8, wherein the processor receives an indication or a configuration for whether or not the channel state report is configured by a wideband report from the base station.

12. The terminal of claim 8, wherein the channel state report configuration includes an aperiodic channel state information request.

13. The terminal of claim 12, wherein when the channel state report is triggered by the aperiodic channel state information request, the LC coefficient, which is transmitted as the channel state report, is mapped to a physical uplink data channel region to which a channel quality indicator is mapped in a manner of being concatenated to the bit of the channel quality indicator in a bit level.

14. The terminal of claim 12, wherein when the channel state report is triggered by the aperiodic channel state information request and the LC coefficient, which is transmitted as the channel state report, is configured by wideband report, the LC coefficient is mapped to a physical uplink data channel region to which the rank indicator is mapped in a manner of being concatenated to the bit of the rank indicator in a bit level.

* * * * *